Oct. 25, 1960     A. B. RANINEN     2,957,384
OPTICAL SIGHTING DEVICE
Filed Nov. 27, 1956     2 Sheets-Sheet 1
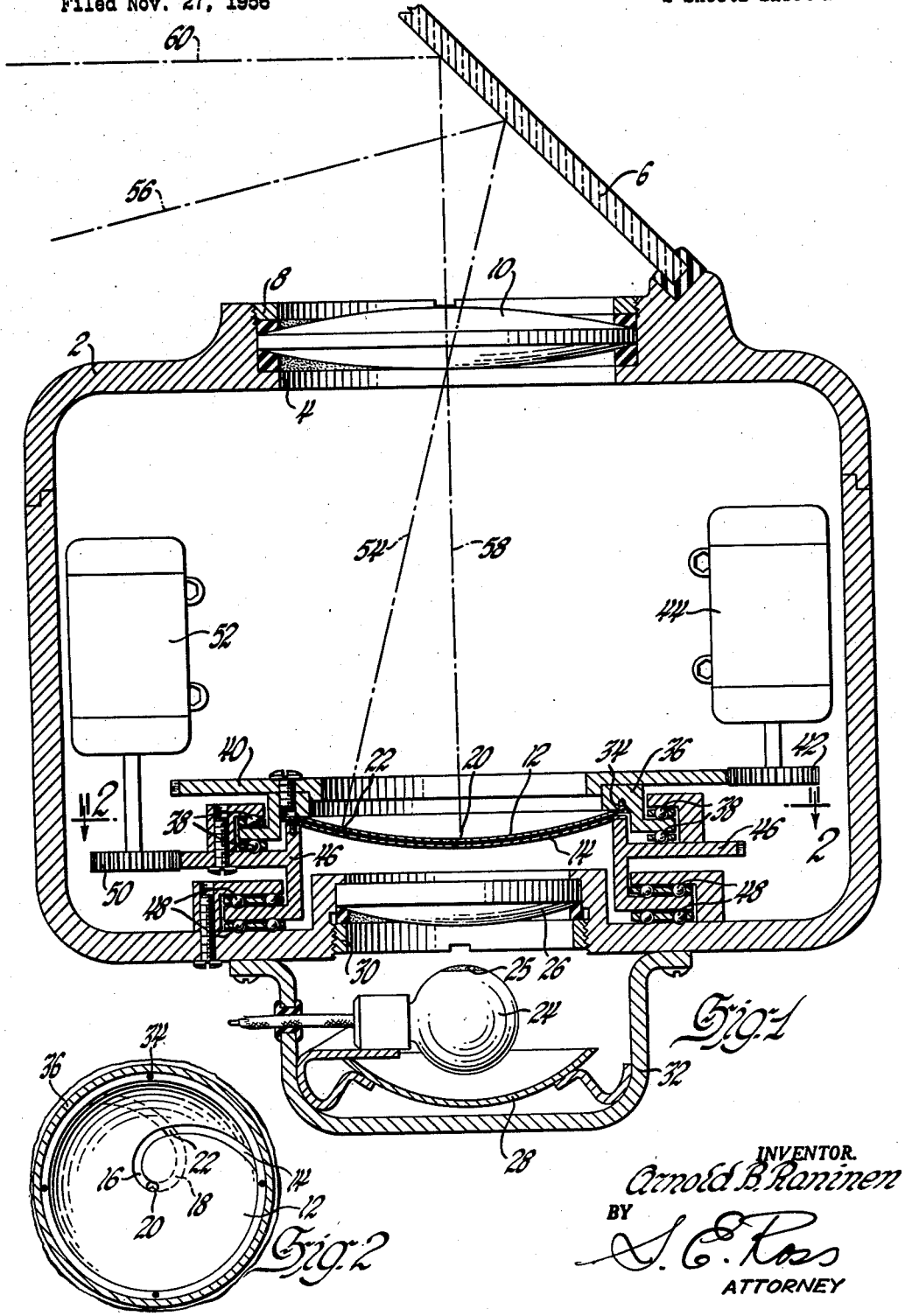
INVENTOR.
Arnold B. Raninen
BY
S. C. Ross
ATTORNEY Oct. 25, 1960     A. B. RANINEN     2,957,384
OPTICAL SIGHTING DEVICE
Filed Nov. 27, 1956     2 Sheets-Sheet 2

INVENTOR.
Arnold B. Raninen
BY
ATTORNEY

United States Patent Office 2,957,384
Patented Oct. 25, 1960

2,957,384

OPTICAL SIGHTING DEVICE

Arnold B. Raninen, Milwaukee, Wis., assignor to General Motors Corporation, Detroit, Mich., a corporation of Delaware Filed Nov. 27, 1956, Ser. No. 624,702

10 Claims. (Cl. 88—1)

This invention relates to a gun sight for aircraft and the like. More particularly, it relates to an improved optical system and arrangement for a gun sight head, the function of which is to project for view by the gunner, a movable or disturbed light pip the position of which is controlled by computing equipment and indicates the prediction angle for the target being sighted. The gun sight may be used either for radar or for visual sighting.

In general, the object of the invention is the provision of accurate, light weight and low volume optical gun sight equipment.

More particularly, one object of the invention is the provision of a gun sight which eliminates the need for relatively expensive and heavy components.

Another object is the provision of a gun sight having movable parts which are of relatively light weight and which therefore have small inertia.

Still another object of the invention is to provide a gun sight which affords a smooth transition between radar sighting and visual sighting.

Other objects and advantages of the invention will appear more clearly from the following description of preferred embodiments and from the drawings of these embodiments in which:

Figure 1 is a side view in section of one embodiment of the invention;

Figure 2 is a top view taken on the line 2—2 of Figure 1 and shows the arrangement of the reticle discs.

Figure 3:
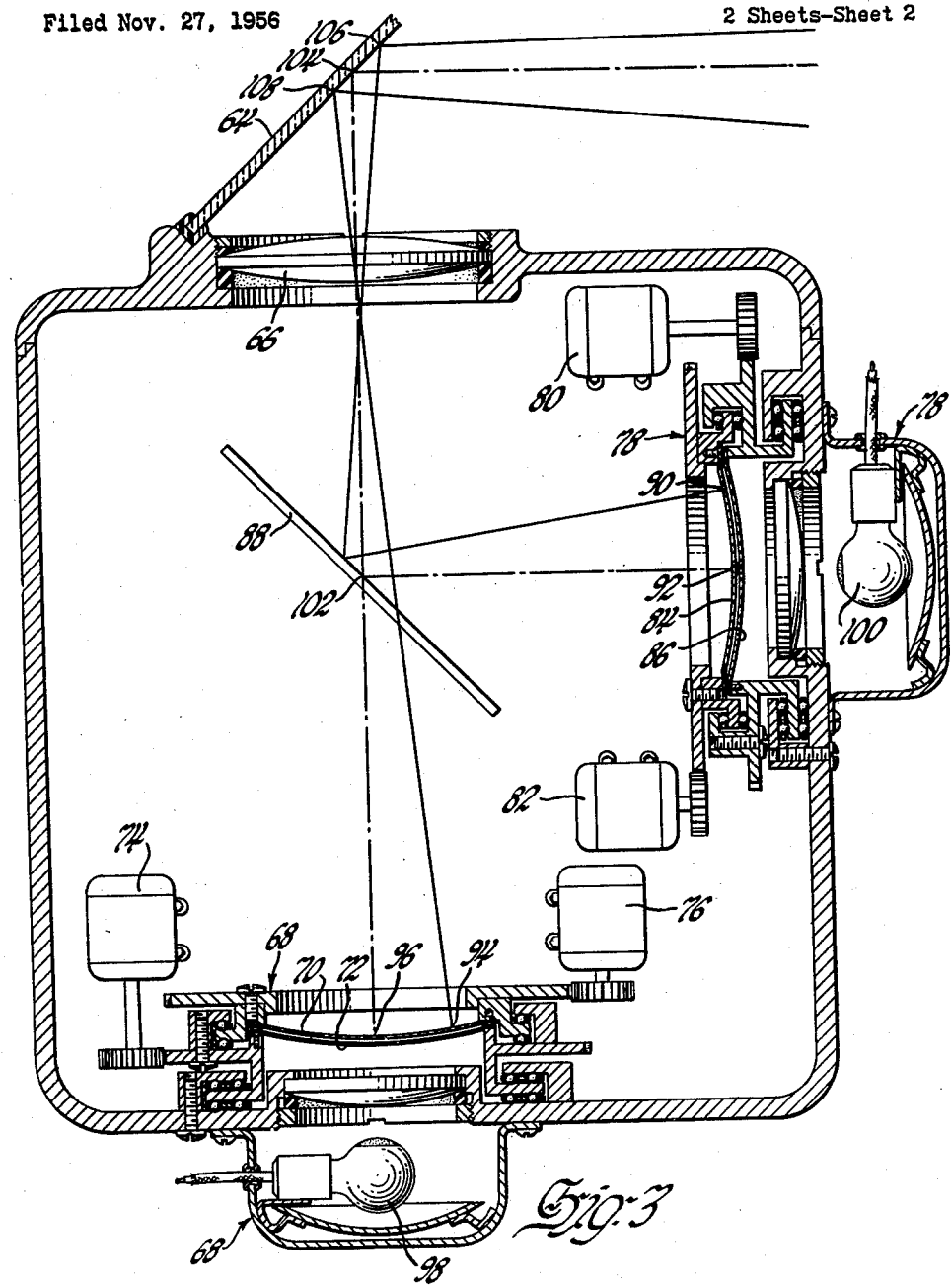
Figure 3 is a side view in section of another embodiment of the invention which allows simultaneous radar and visual sighting.

Referring now to Figure 1, the gun sight shown includes a housing 2 having an opening 4 in the top wall thereof. Positioned over the opening 4 and secured to housing 2 is a transparent combining screen 6 which is oriented at such an angle as to reflect, as indicated, the light rays emanating from the opening 4. The screen 6 might be the windshield panel of an airplane or a member separate from the windshield.

Before proceeding further with the description of the structure of the device, it is well to note that its function and purpose are to provide for the pilot or observer a disturbed light pip focused at infinity, the position of which at any time defines the prediction angle for the target being sighted. Thus, when the disturbed pip is brought on target by maneuver of the gun platform, the guns will be properly aimed to take into account all the various factors which effect aim such, for example, as the relative speed and direction of the gun platform with respect to the target, air density, muzzle velocity of the guns, etc. For hereinafter stated reasons, it is also desirable that the device provide a fixed light pip, focused at infinity, which defines the gun boresight line.

Secured within opening 4 as by means of gaskets and threaded lock ring 8 is a collimating lens 10, the curvature and material of which are such that the lens has a spherical focal surface. The focal surface of a lens is, of course, that surface on which all parallel light rays passing through the lens will be focused or, to put it in another way, that surface which includes all light origins the rays of which will be collimated by the lens. In the particular embodiment shown, a single convex-convex collimating lens is utilized; however, it is to be understood that other lenses or lens systems might be used, provided that in all instances that the lens or lens system have a spherical focal surface.

Positioned at and occupying the spherical focal surface of lens 10 are two dished spherical reticle discs 12 and 14 each having the same diameter and each having the same radius of spherical curvature as that of the spherical focal surface of lens 10. These discs are concentrically arranged, having a common center axis of rotation, and are spaced slightly apart to allow relative rotation for each with respect to the other about such axis. The discs are positioned such that the space between them actually defines the spherical focal surface of lens 10. Discs 12 and 14 are provided with light transmitting slots 16 and 18 respectively, in each instance one end of the slot occupying the geometric center or axis of rotation of the disc. As can best be seen in Figure 2, each slot is in the form of a spiral curve having a continuously increasing radius of curvature starting from the center of the disc in one direction and curving around to an opposite direction toward and ending adjacent the periphery of the disc. In disc 12 the slot extends in a clockwise direction, as shown, and in disc 14 the slot extends in an opposite or counterclockwise direction, as shown. Thus, as the two discs are rotated together or one with respect to the other about its or their center axis, the ends of the two slots positioned at the axis of rotation will always be aligned to define a light transmitting aperture, indicated at 20, which remains in fixed position irrespective of the relative positions of the discs. Also, depending upon the relative rotary orientation of the discs one with respect to the other, the slots will intersect at another point to define a movable aperture, the position of this aperture depending upon the rotary position of the discs with respect to each other. As seen in Figure 2, the discs are in such position that the slots 16 and 18 intersect to define a movable aperture 22 to thereby allow the transmission of a beam of light at that point. It will be obvious that since the discs are rotatable together or one with respect to the other, the movable aperture may take any of an infinite number of positions outwardly or inwardly and around the fixed aperture 20. Slots having shapes other than those shown may, of course, be used, the shapes selected being dependent upon the relationship desired between movement of the movable aperture and movement of the discs. It is desirable that there be a minimum of distortion, such as elongation, of the movable aperture at all times, for example just prior to its merging with the fixed aperture and, in this respect, slots of the shape shown and described above are advantageous.

On the side of the discs opposite from the lens 10 and aligned with the discs and lens 10 there is provided a suitable light source to direct rays through fixed aperture 20 and movable aperture 22. In the embodiment shown this light source includes light bulb 24, condensing lens 26 positioned between the light bulb and the discs, and reflector 28 located behind the light bulb or at that side of the light bulb oppositely disposed from condensing lens 26. A threaded lock ring 30 similar to that used at 8 provides means for securing condensing lens 26 within the housing. In order to facilitate light bulb replacement, a readily removable housing extension 32 is utilized to enclose and support the bulb as well as reflector 28. Condensing lens 26 and reflector 28 are not essential elements. The only requirement of the light source is that it provide light of sufficient intensity and in the correct direction to transmit light through the fixed and movable apertures through lens 10 and thence to the combining screen. A ground glass window, for example, may serve in place of the condensing lens 26.

Preferably, two distinct light colors are used, one color for transmission through fixed aperture 20 and the other color for transmission through movable aperture 22. Such a two-colored light source may be furnished by way of a colored coating, say red, over a portion of the bulb 24, as shown at 25, or could be furnished by two separate differently colored light bulbs or by a colored filter secured to the center of lens 26 or to the innermost portion of one of the slots 16 or 18, if desired. Thus, the light deriving from aperture 20 would be red, whereas the light deriving from aperture 22 would be white, for example.

Disc 12 is secured, as shown at 34, to a rotatable metal ring 36 which is supported by bearing 38 and which is fixedly secured to ring gear 40. The toothed periphery of ring gear 40 is engaged for rotation by a gear 42 which in turn is driven by servo motor 44.

Disc 14 in much the same manner is fixedly secured to ring gear 46 which is supported by bearing 48 and engaged for rotation by gear 50, in turn driven by servo motor 52. Thus, the positions of slots 16 and 18 in the discs and therefore the location of movable aperture 22 will be determined by servo motors 44 and 52. These two servo motors 44 and 52 are, of course, responsive to the radar, gyroscopic or other apparatus used in conjunction with the sight head to accurately compute and relay the azimuth and elevation components of the preditcion angle for the guns.

It is particularly important to note that the optical system shown and described is such that the prediction angle, as defined by beams 54 and 58, is a linear function of the distance between fixed aperture 20 and movable aperture 22. This is, of course, an essential and key feature of the device and results from lens 10 having a spherical focal surface with light apertures 20 and 22 being located on this spherical focal surface.

When used for visual sighting, the operation of the sight head is as follows: Servo motors 44 and 52, responding to the gyro and other prediction angle computing apparatus, are actuated to rotate discs 12 and/or 14 through the above-described gear systems, the relative positions of the discs determining the location of movable aperture 22. Light emanating from bulb 24 and transmitted by lens 26, passes through movable aperture 22 and through lens 10 as indicated at 54, thence to define a disturbed light pip, focused at infinity, by means of screen 6 which pip is reflected as indicated at 56 to the gunner's eye. Since lens 10 is a collimating lens, the light pip will be focused at infinity, this to provide a minimum of eye strain for the gunner and to allow some eye movement without affecting the visual location of the pip on the screen. The pip will, of course, be visible to the gunner only when his eye is within a certain area defined by the light cone which is established by the optical system shown; however, within this area, the precise position of the gunner's eye has no effect on accuracy. It is only necessary for the gunner to align the disturbed light pip on the target by maneuver of the gun platform and, when within proper range, to fire the guns.

In addition to the disturbed light pip, there is transmitted to the viewing screen 6 a fixed light pip which, as explained previously, may, if desired, be of a different color than the disturbed pip. This fixed pip derives from the light of bulb 24 which passes through fixed aperture 20 to project a beam, indicated at 58, through collimating lens 10 then to be reflected as shown at 60 by the screen to the gunner's eye. In visual sighting of moving targets, the fixed pip need not be used; however, it is useful for visual sighting in that it constantly indicates to the gunner the position of the gun boresight line from which the prediction angle, as defined by the disturbed pip, is measured, thereby assuring him that the apparatus is functioning properly. In aiming at stationary or relatively stationary targets, i.e., ground targets, the fixed pip is useful and is generally used instead of the disturbed pip. Further, the fixed pip provides a convenient means for adjustment or "zeroing" of the gun sight prior to use. The fixed light pip is, of course, also important and in fact necessary for radar sighting.

Operation of the gun sight for radar sighting is much the same as in the instance of visual sighting except that servo motors 44 and 52 are controlled by radar to fix the relative positions of discs 12 and 14 in accordance with the prediction angle computations relayed by such apparatus. The gunner, when aiming on radar, maneuvers the gun platform until the disturbed pip merges with the fixed pip and then, when within proper range, fires the guns.

The embodiment shown in Figure 3 is similar in most respects to that shown in Figure 1 but is suited for simultaneous or rapidly sequential radar and visual sighting. In this embodiment, the combining glass 64, collimating lens 66 with a spherical focal surface, and the reticle disc assembly shown at 68 are identical in function and design to the corresponding parts of the device shown in Figure 1 described above, 70 and 72 being spherical shaped slotted discs positioned at the spherical focal surface of lens 66 (the space between the discs actually occupying the spherical focal surface) and rotatable together or relative to each other through gear trains actuated by servo motors 74 and 76, respectively, which are controlled by the azimuth and elevation computing apparatus for visual sighting. Positioned in another side of the housing is another reticle disc assembly 78, again identical to that described above with reference to Figure 1 and to that shown at 68. However, the servo motors 80 and 82 which actuate rotation of the slotted spherical discs 84 and 86 of this assembly are controlled by radar apparatus to provide the required azimuth and elevation correction computations.

Positioned adjacent the center of the housing is a flat, semi-transparent mirror 88, the plane of which is set at an angle to discs 70 and 72 and to discs 84 and 86. This angle is such as to reflect through lens 66, the light from movable aperture 90 and fixed aperture 92 from the assembly shown at 78, but at the same time to allow passage to lens 66 of the light from movable aperture 96 and fixed aperture 94 of the assembly shown at 68.

In order to allow the gunner to distinguish between light pips by color, it is preferable to use a two-color light source for each of the assemblies 68 and 78, the color for transmission through fixed apertures 96 and 92 being common to both. For example, the light source indicated at 98 may be white and red and the light source indicated at 100, white and green. This would provide on combining screen 64 a white gun boresight pip, a green radar controlled disturbed pip and a red visual sighting disturbed pip.

Discs 84 and 86 are positioned on the spherical focal surface of collimating lens 66 as reflected by mirror 88, the space between these discs actually occupying said spherical focal surface. As in the embodiment shown in Figure 1, all pips, fixed and disturbed, are focused at infinity by means of collimating lens 66. Also, as in the embodiment shown in Figure 1, the prediction angle provided by assembly 68 is a linear function of the distance between apertures 94 and 96 and the prediction angle provided by assembly 78 is a linear function of the distance between apertures 90 and 92, this being a key feature provided by the positions of the pairs of discs on the spherical focal surface of lens 66 as described above.

Operation of the embodiment shown in Figure 3 is as follows:

For visual sighting, assembly 78 is not required and operation of assembly 68 together with lens 66 and screen 64 is the same as described above in connection with the embodiment shown in Figure 1, gyros and other visual computing apparatus being operative to actuate servo motors 74 and 76.

For radar controlled operation or simultaneous or sequential radar-visual controlled operation, both assemblies, 68 and 78 are required. The light beams from fixed apertures 92 and 96 are combined as shown at 102 to project against screen 64 a single gun boresight light pip indicated at 104. The light beam from movable aperture 90 is reflected by semi-transparent mirror 88 to project a disturbed radar controlled pip, indicated at 106. At the same time, the light beam from movable aperture 94 passes through semi-transparent mirror 88 to project against screen 64 a disturbed visual target light pip indicated at 108. Thus, the gunner will see on screen 64, focused at infinity, a fixed gun boresight pip, say white in color, a radar controlled disturbed pip, say green in color, and a third disturbed pip, say red in color, this third pip being controlled by the visual computing apparatus. If the gun platform is an airplane, when said airplane is in a cloud, for example, such that the pilot (gunner) depends upon radar for sighting, he would maneuver the plane until the green radar distributed pip coincided with the red disturbed pip and when within proper range, fire the guns. If the plane leaves the cloud so as to come within sight of the target, the pilot would see the target within the confines of the green disturbed pip and would be in position to immediately fire on visual sighting. Thus, the device provides smooth, quick transition from radar to visual and from visual to radar sighting.

It will be obvious that the gun sight described has numerous important advantages over those heretofore used. In all embodiments, only a single collimating lens is required. Only a single optical system is required for both radar and visual sighting. Simultaneous or rapidly sequential radar and visual sighting is possible. The moving components in the optical system which determine the position of the disturbed pip or pips may be of very light weight and therefore low inertia. The discs 12 and 14, for example, are but a fraction of the weight of a mirror which is generally utilized as the movable optical component in gun sights.

While the embodiments of the invention herein disclosed constitute a preferred form, it is understood that other forms might be adopted, all coming within the scope of the claims which follow.

I claim:

1. An optical device for a gun sight comprising a housing having an opening therein, a lens in said opening, said lens having a spherical focal surface located within said housing, light directing means in said housing occupying the spherical focal surface of said lens for directing a narrow beam of light toward said lens from a point position on said spherical focal surface, said means being movable such that the point position on said spherical focal surface from which said narrow beam is directed toward said lens is dependent on the position of said means, and a reflector plate outside said housing adjacent and at an angle to the plane of said lens to reflect the light beam transmitted by said lens.

2. An optical device for a gun sight comprising a housing having an opening therein, a lens in said opening, said lens having a spherical focal surface located within said housing, light directing means in said housing occupying the spherical focal surface of said lens for directing a narrow beam of light toward said lens from one fixed position on said spherical focal surface and for directing a second narrow beam of light toward said lens from another point position on said spherical focal surface, said means being movable such that the focal surface, said means being movable such that the point position on said spherical surface from which said second narrow beam of light is directed toward said lens is dependent on the position of said means, and a reflector plate outside said housing adjacent and at an angle to the plane of said lens to reflect the light beams transmitted by said lens.

3. A gun sight comprising a housing having an opening therein, a lens in said opening having a spherical focal surface, a pair of closely adjacent spaced spherical dished discs in said housing occupying the spherical focal surface of said lens, each of said discs being rotatable about a common center axis of rotation and being provided with a light transmitting slot, the slots in said discs being shaped to overlap at the axis of rotation of said discs to form a fixed light transmitting aperture and being further shaped to provide a second overlap therebetween to form a movable light transmitting aperture, the location of said movable aperture being dependent upon the relative rotative positions of said discs one to the other, means for projecting light through said apertures toward said lens and means for rotating each of said discs on its axis of rotation.

4. A gun sight as set forth in claim 3 and including a colored light filter element to cause the light transmitted by one of said apertures to be colored.

5. In a gun sight, a housing having an opening therein, a collimating lens in said opening having a spherical focal surface, a pair of closely adjacent spaced spherical dished discs in said housing occupying the spherical focal surface of said lens, said discs being rotatable together and individually about a common center axis of rotation, each of said discs having a slot with one end positioned on the axis of rotation and the other end adjacent the periphery of said disc, the slot in one of said discs being curved in a clockwise direction and the slot in the other of said discs being curved in a counterclockwise direction so that light transmitting apertures are formed where said slots overlap, means for projecting light through said apertures toward said lens and means for rotating each of said discs on its center axis of rotation.

6. A gun sight comprising a housing having an opening therein, a collimating lens in said opening having a spherical focal surface, a reflector plate outside said housing adjacent said lens and at an angle thereto to reflect light rays transmitted by said lens, a pair of closely adjacent spaced concentric spherical dished discs in said housing occupying the spherical focal surface of said lens, said discs being rotatable with respect to each other about a common center axis of rotation, each of said discs having a spiral shaped slot with one end positioned on the axis of rotation and the other end adjacent the periphery of said disc, the slot in one of said discs being curved in a clockwise direction and the slot in the other of said discs being curved in a counterclockwise direction so that light transmitting apertures are formed where said slots overlap, means for projecting light through said apertures toward said lens and means for rotating each of said discs on its center axis of rotation.

7. A gun sight comprising a housing having an opening therein, a collimating lens in said opening having a spherical focal surface, a transparent reflector plate outside said housing adjacent said lens and at an angle thereto to reflect light rays transmitted by said lens, a pair of closely adjacent spaced concentric spherical dished discs in said housing occupying the spherical focal surface of said lens, said discs being rotatable with respect to each other about a common center axis of rotation, each of said discs having a spiral shaped slot with one end positioned on the axis of rotation and the other end adjacent the periphery of said disc, the slot in one of said discs being curved in a clockwise direction and the slot in the other of said discs being curved in a counterclockwise direction so that light transmitting apertures are formed where said slots overlap, a light source for projecting light through said apertures toward said lens and driving means including a bearing supported ring gear having concentrically secured thereto one of said discs, a second gear in meshed engagement with said ring gear and a servo motor in driving connection with said second gear.

8. An optical device for a gun sight comprising a housing having an opening therein, a lens in said opening having a spherical focal surface located within said housing, a reflector plate outside said housing adjacent said lens and at an angle thereto to reflect light beams transmitted by said lens, movable light directing means in said housing occupying the spherical focal surface of said lens for directing a narrow beam of light toward said lens from any of an infinite number of point positions on said spherical focal surface, a flat semi-transparent mirror in said housing between said means and said lens and positioned at an angle to the plane of said lens, and a second movable light directing means in said housing for directing toward said semi-transparent mirror a narrow beam of light from any of an infinite number of point positions on the spherical focal surface of said lens as optically reflected by said semi-transparent mirror, said semi-transparent mirror being positioned to transmit to said lens the beam of light from said first-mentioned means and to reflect toward said lens the beam of light from said second-mentioned means.

9. A gun sight comprising a housing having an opening therein, a collimating lens in said opening having a spherical focal surface, a reflector plate outside said housing adjacent said lens and at an angle thereto to reflect light rays transmitted by said lens, a pair of closely adjacent concentric and individually rotatable spherical dished discs in said housing occupying the spherical focal surface of said lens, a flat semi-transparent mirror in said housing between said discs and said lens positioned at an angle to the plane of said lens, a second pair of closely adjacent spaced spherical dished discs in said housing occupying a spherical surface which coincides with the spherical focal surface of said lens as optically reflected by said semi-transparent mirror, each of said pairs of discs having a common center axis of rotation and each of said discs of said pairs of discs having a spiral shaped slot with one end positioned on its axis of rotation, and the other end positioned adjacent its periphery, the slot in one of the discs of each of said pairs of discs being curved in a clockwise direction and the slot in the other disc of each of said pairs of discs being curved in a counterclockwise direction so that light transmitting apertures are formed where said slots in each of said pairs of discs overlap, means for projecting light through said apertures to said lens and means for rotating each of said discs on its center axis of rotation.

10. A gun sight comprising a housing having an opening therein, a collimating lens in said opening having a spherical focal surface, a transparent reflector plate outside said housing adjacent said lens and at an angle thereto to reflect light rays transmitted by said lens, a pair of closely adjacent spaced concentric spherical dished discs in said housing occupying the spherical focal surface of said lens, each of said discs being rotatable with respect to each other about a common center axis of rotation and being provided with a light transmitting slot, the slots in said discs being shaped to overlap at the axis of rotation of said discs to form a fixed light transmitting aperture and being further shaped to provide a second overlap therebetween to form a movable light transmitting aperture, the location of said movable aperture being dependent upon the relative rotative positions of said discs one to the other, means for projecting light through said apertures toward said lens and means for rotating each of said discs on its center axis of rotation, said last-mentioned means including a ring gear secured to the periphery of each of said discs and a servo motor operatively engaged with each of said ring gears to cause rotation thereof.

References Cited in the file of this patent

UNITED STATES PATENTS

| | | |
|---|---|---|
| 1,889,151 | Pechan | Nov. 29, 1932 |
| 2,190,569 | Macgill | Feb. 13, 1940 |
| 2,384,643 | Schade | Sept. 11, 1945 |
| 2,401,327 | Bednash | June 4, 1946 |
| 2,405,731 | Beggs | Aug. 13, 1946 |
| 2,406,828 | Grimshaw | Sept. 3, 1946 |
| 2,463,233 | Alexanderson | Mar. 1, 1949 |
| 2,527,245 | Cunningham | Oct. 24, 1950 |
| 2,566,389 | Walk | Sept. 4, 1951 |
| 2,725,781 | Banker | Dec. 6, 1955 |